(12) United States Patent
Uehira et al.

(10) Patent No.: US 9,746,319 B2
(45) Date of Patent: Aug. 29, 2017

(54) GENERATION OF DEPTH DATA BASED ON SPATIAL LIGHT PATTERN

(71) Applicant: Empire Technology Development LLC, Wilmington, DE (US)

(72) Inventors: Kazutake Uehira, Tokyo (JP); Masahiro Suzuki, Saitama (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 3 days.

(21) Appl. No.: 14/660,769

(22) Filed: Mar. 17, 2015

(65) Prior Publication Data

US 2015/0198439 A1    Jul. 16, 2015

Related U.S. Application Data

(63) Continuation of application No. 13/122,912, filed as application No. PCT/JP2010/005965 on Oct. 5, 2010, now Pat. No. 9,030,466.

(51) Int. Cl.
*G06T 15/00*    (2011.01)
*G01B 11/25*    (2006.01)
(Continued)

(52) U.S. Cl.
CPC ...... *G01B 11/2513* (2013.01); *G01B 11/2545* (2013.01); *G06T 15/00* (2013.01);
(Continued)

(58) Field of Classification Search
CPC ......... G06T 7/0075; G06T 2207/10012; G06T 7/0022; H04N 13/0239; H04N 2013/0081
See application file for complete search history.

(56) References Cited

U.S. PATENT DOCUMENTS

| 4,743,771 A | 5/1988 | Sacks et al. |
| 4,920,273 A | 4/1990 | Sacks et al. |

(Continued)

FOREIGN PATENT DOCUMENTS

| JP | S622118 A | 1/1987 |
| JP | H0560528 A | 3/1993 |

(Continued)

OTHER PUBLICATIONS

International Search Report and Written Opinion for PCT Application No. PCT/JP2010/005965, mailed on Dec. 28, 2010.

(Continued)

*Primary Examiner* — Abderrahim Merouan
(74) *Attorney, Agent, or Firm* — Xinova, LLC/Dorsey & Whitney LLP

(57) ABSTRACT

Technologies are generally described for generating depth data based on a spatial light pattern. In some examples, a method of generating depth data includes obtaining an image of one or more objects on which a spatial light pattern is projected, wherein blurring of the spatial light pattern in the image monotonously increases or decreases in a depth direction, calculating a value of a spatial frequency component of the image in a local image area around a pixel of interest, and determining depth data corresponding to the calculated value of the spatial frequency component by utilizing a preset relationship between depths and values of the spatial frequency component.

20 Claims, 9 Drawing Sheets

(51) Int. Cl.
*G06T 17/20* (2006.01)
*G06T 15/10* (2011.01)
*G06T 17/00* (2006.01)
*G06T 19/00* (2011.01)

(52) U.S. Cl.
CPC .............. *G06T 15/10* (2013.01); *G06T 17/00* (2013.01); *G06T 17/20* (2013.01); *G06T 19/00* (2013.01)

(56) References Cited

U.S. PATENT DOCUMENTS

| | | | |
|---|---|---|---|
| 5,305,092 A | 4/1994 | Mimura et al. | |
| 6,045,515 A * | 4/2000 | Lawton | A61B 3/022 351/223 |
| 6,229,913 B1 | 5/2001 | Nayar et al. | |
| 6,330,066 B1 | 12/2001 | Tanaka et al. | |
| 6,947,582 B1 | 9/2005 | Vilsmeier et al. | |
| 7,342,608 B2 | 3/2008 | Yoshida | |
| 7,440,590 B1 | 10/2008 | Hassebrook et al. | |
| 7,583,272 B2 | 9/2009 | Ramani et al. | |
| 7,602,999 B2 | 10/2009 | Konishi | |
| 7,609,724 B1 * | 10/2009 | Frederiks | H04J 3/1629 370/252 |
| 7,999,844 B2 * | 8/2011 | Richards | G02B 27/2228 348/42 |
| 8,885,941 B2 | 11/2014 | Schiller et al. | |
| 2003/0156181 A1 * | 8/2003 | Bouchard | H04N 1/506 347/172 |
| 2003/0156260 A1 * | 8/2003 | Putilin | H04N 13/0497 353/10 |
| 2004/0036687 A1 * | 2/2004 | Nakamura | G06T 3/4007 345/422 |
| 2005/0254688 A1 | 11/2005 | Franz | |
| 2006/0098231 A1 | 5/2006 | Konishi | |
| 2007/0019266 A1 * | 1/2007 | Kihara | G03H 1/30 359/23 |
| 2007/0081200 A1 * | 4/2007 | Zomet | H04N 1/04 358/484 |
| 2007/0140333 A1 | 6/2007 | Chono et al. | |
| 2007/0177160 A1 | 8/2007 | Sasaki | |
| 2008/0308712 A1 * | 12/2008 | Ono | G02B 5/26 250/208.1 |
| 2009/0161964 A1 * | 6/2009 | Tzur | G06K 9/3208 382/203 |
| 2009/0187242 A1 | 7/2009 | Weeber et al. | |
| 2009/0234448 A1 | 9/2009 | Weeber et al. | |
| 2009/0238449 A1 | 9/2009 | Zhang et al. | |
| 2009/0239308 A1 * | 9/2009 | Dube | C12Q 1/6837 436/94 |
| 2009/0268985 A1 | 10/2009 | Wong et al. | |
| 2010/0174599 A1 * | 7/2010 | Rosenblatt | G06Q 30/02 705/14.37 |
| 2010/0238189 A1 * | 9/2010 | Feng | G09G 3/3426 345/589 |
| 2010/0265355 A1 * | 10/2010 | Sato | G02B 13/0045 348/222.1 |
| 2010/0278390 A1 | 11/2010 | Silveira et al. | |
| 2010/0296751 A1 | 11/2010 | Yanai | |
| 2011/0019056 A1 * | 1/2011 | Hirsch | G06F 3/0325 348/333.01 |
| 2011/0020740 A1 * | 1/2011 | Sugino | G03G 5/0525 430/56 |
| 2011/0058085 A1 * | 3/2011 | Ito | G03B 13/00 348/333.02 |
| 2011/0080400 A1 | 4/2011 | Yamada | |
| 2011/0150082 A1 | 6/2011 | Lu et al. | |
| 2011/0176708 A1 | 7/2011 | Silveira et al. | |
| 2011/0292234 A1 * | 12/2011 | Mitsumoto | H04N 5/2621 348/222.1 |
| 2011/0304532 A1 * | 12/2011 | Suh | G09G 3/3406 345/156 |
| 2012/0050501 A1 * | 3/2012 | Narita | G06F 3/011 348/51 |
| 2012/0257029 A1 | 10/2012 | Igarashi et al. | |

FOREIGN PATENT DOCUMENTS

| | | |
|---|---|---|
| JP | H10508107 A | 8/1998 |
| JP | 2001027517 A | 1/2001 |
| JP | 2005017805 A | 1/2005 |
| JP | 2006-098252 A1 | 4/2006 |
| JP | 2006098252 A | 4/2006 |
| JP | 2009008649 A | 1/2009 |
| WO | 2008120217 A2 | 10/2008 |

OTHER PUBLICATIONS

Kahn, A. et al., "Hiding Depth Map of an Object in its 2D Image: Reversible Watermarking for 3D Cameras", ICCE '09. Digest of Technical Papers International Conference on Consumer Electronics, Jan. 10-14, 2009, 1-2.

Zhang, S, "3D Surface Data Acquisition", Department of Mechanical Engineering, Oct. 16, 2003, 1-32.

* cited by examiner

GENERATION OF DEPTH DATA BASED ON SPATIAL LIGHT PATTERN

CROSS-REFERENCE TO RELATED APPLICATION(S)

This application is a continuation application under 35 U.S.C. §120 of U.S. patent application Ser. No. 13/122,912, filed on Apr. 6, 2011, issued as U.S. Pat. No. 9,030,466 on May 12, 2015, which is a U.S. National Stage filing under 35 U.S.C §371 of International Application No. PCT/JP2010/005965, filed on Oct. 5, 2010, the applications and disclosures of which are hereby incorporated by reference, in their entirety, for any purpose.

TECHNICAL FIELD

The disclosures herein generally relate to the generation of depth data.

BACKGROUND

Unless otherwise indicated herein, the approaches described in this section are not prior art to the claims in this application and are not admitted to be prior art by inclusion in this section.

Images for stereoscopic viewing may be composed of an image for the right eye and an image for the left eye. The observer may typically use special glasses that make the right eye see only the image for the right eye and the left eye see only the image for the left eye, thereby giving the observer the perception of a three-dimensional scene. There may be two typical methods for transmitting image data for stereoscopic viewing. The first method may involve sending both left-eye and right-eye images, which may result in twice as much data as normal 2D-image data being transmitted. The second method may involve creating a depth map from a left-eye image and a right-eye image and then transmitting the resulting depth map together with either the left-eye or right-eye image. The recipient of the data may use the depth map to recreate one of the two images that has not been sent. The second method may also result in a larger amount of data than normal 2D-image data being transmitted. Further, the need to generate a depth map at a transmission side may impose additional computation load.

SUMMARY

According to one or more embodiments, a method of generating depth data includes calculating a value of a spatial frequency component of image data in a local image area around a pixel of interest, wherein the image data is representative of one or more objects on which a spatial light pattern is projected and blurring of the spatial light pattern in the image data increases or decreases in a depth direction, and determining depth data corresponding to the calculated value of the spatial frequency component by utilizing a preset relationship between depths and values of the spatial frequency component.

According to one or more embodiments, an apparatus for generating depth data includes a frequency component calculating unit configured to calculate a value of a spatial frequency component of the image data in a local image area around a pixel of interest, wherein the image data is representative of one or more objects on which a spatial light pattern is projected and blurring of the spatial light pattern in the image data increases or decreases in a depth direction, and a depth map generating unit configured to determine depth data corresponding to the calculated value of the spatial frequency component by utilizing a preset relationship between depths and values of the spatial frequency component.

According to one or more embodiments, a system for generating depth data includes a projection unit configured to project a spatial light pattern, and an imaging unit configured to capture an image of one or more objects on which the spatial light pattern is projected, wherein blurring of the spatial light pattern in the image increases or decreases in a depth direction such that the depth data corresponding to a calculated value of a spatial frequency component of the image in a local image area around a pixel of interest can be determined by utilizing a preset relationship between depths and values of the spatial frequency component.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
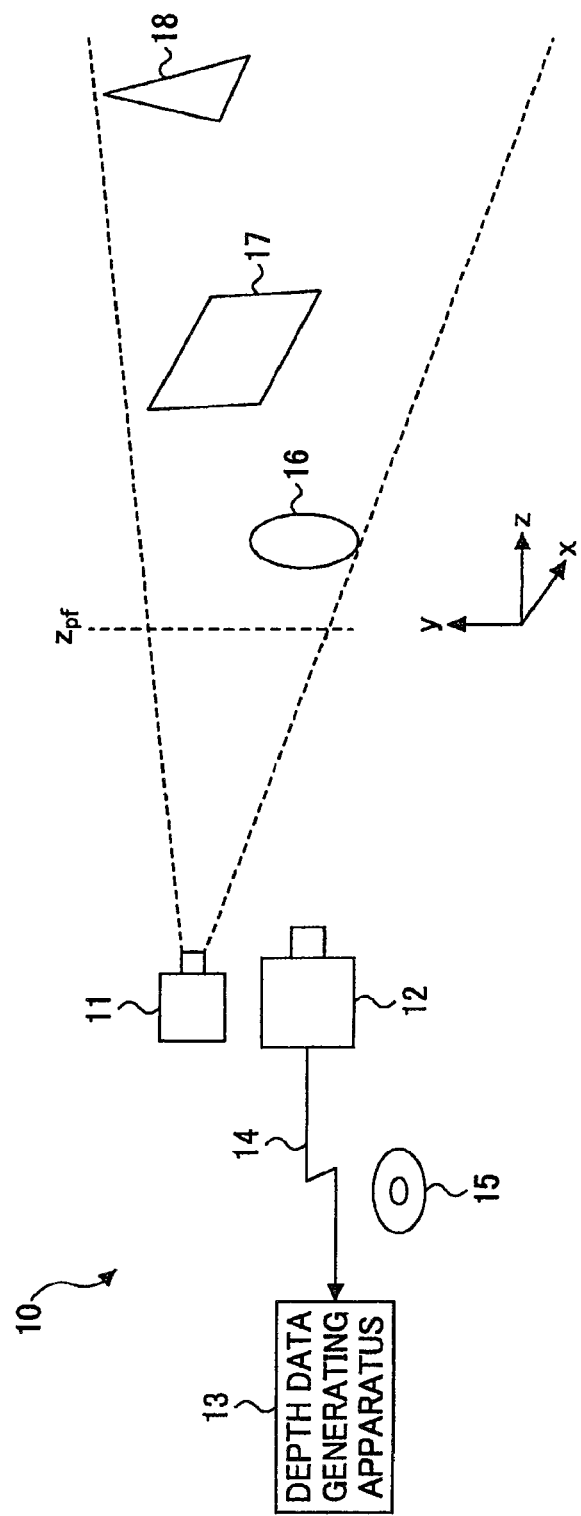
FIG. 1 is a drawing illustrating an example of a depth data generating system.

The following detailed description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is drawn, inter alia, to methods, apparatus, devices, and/or systems related to the generation of depth data.

Briefly stated, technologies are generally described herein for a method of and apparatus for generating depth data. In some examples, the method may include obtaining an image of one or more objects on which a spatial light pattern is projected, wherein blurring of the spatial light pattern in the image monotonously increases or decreases in a depth direction, calculating a value of a spatial frequency component of the image in a local image area around a pixel of interest, and determining depth data corresponding to the calculated value of the spatial frequency component by utilizing a preset relationship between depths and values of the spatial frequency component.

FIG. 1 is a drawing illustrating an example of a depth data generating system arranged in accordance with at least some embodiments described herein. A depth data generating system 10 illustrated in FIG. 1 may include a projection unit 11, an imaging unit 12, and a depth data generating apparatus 13. For the sake of convenience of explanation, three orthogonal directions in space may be represented by the x, y, and z axes of a coordinate system, with the z axis corresponding to the depth direction of the projection unit 11 and the imaging unit 12. The projection unit 11 may be configured to emit a spatial light pattern. The projection unit 11 may be a conventional projector capable of projecting a high-definition image generated by a film medium or the like. The projection unit 11 may alternatively be a digital projector employing liquid-crystal-display panels or a DLP (digital light processing) projector employing Digital Micro-Mirror Devices. In such a case, display data of the spatial light pattern to be projected may be input into the projection unit 11. The imaging unit 12 may be configured to capture an image of one or more objects 16 through 18 on which the spatial light pattern is projected. The imaging unit 12 may be a camera that employs an imaging device such as a CCD (Charge Coupled Device) image sensor or CMOS (Complementary Metal Oxide Semiconductor) image sensor. The optical system parameters of the projection unit 11 and the imaging unit 12 may be adjusted such that blurring of the spatial light pattern in the captured image monotonously increases or decreases in the depth direction z. How to achieve such optical system parameters may be described later in detail.

The imaging unit 12 may operate as a still camera to produce a single image at a time, or may operate as a video or motion camera to produce a series of images continuously during an activated state. Images produced or generated by the imaging unit 12 are supplied to the depth data generating apparatus 13. The supply of the images may be via a transitory medium 14 or a non-transitory medium 15. The transitory medium 14 may be a communication line through which electrical signals are transmitted, or may be space through which electromagnetic signals are transmitted. The non-transitory medium 15 may be a tangible recording medium such as a Compact Disc (CD), a Digital Versatile Disk (DVD), a memory card, or the like.

The depth data generating apparatus 13 may be configured to generate depth data indicative of a position z in the depth direction at a pixel corresponding to any given x, y position in an image captured by the imaging unit 12. Such depth data may be extracted from an image captured by the imaging unit 12. Namely, the depth data generating apparatus 13 may generate depth data indicative of the distance of the object 16, for example, from the imaging unit 12 by analyzing the image captured by the imaging unit 12. The depth data generating apparatus 13 may generate a depth map indicative of depths at all the pixels in the image.

In order to generate depth data, the depth data generating apparatus 13 may calculate a value of a pre-determined spatial frequency component of the image in a local image area around a pixel of interest. The depth data generating apparatus 13 may then determine depth data corresponding to the calculated value of the spatial frequency component by utilizing a preset relationship between depths and values of the spatial frequency component. As previously noted, the blurring of the spatial light pattern in the captured image may monotonously increase or decrease in the depth direction z. In such a case, the value of the predetermined spatial frequency component may monotonously increase or decrease in the depth direction z. The relationship between depths and values of the predetermined spatial frequency component may be provided as a mathematical formula. Alternatively, the relationship between depths and values of the predetermined spatial frequency component may be obtained in advance and stored as a lookup table or the like in memory. This lookup table may be referred to when determining depth data, so that a depth value corresponding to the value of the predetermined spatial frequency component calculated for a pixel of interest may be located in the table.

Figure 2:
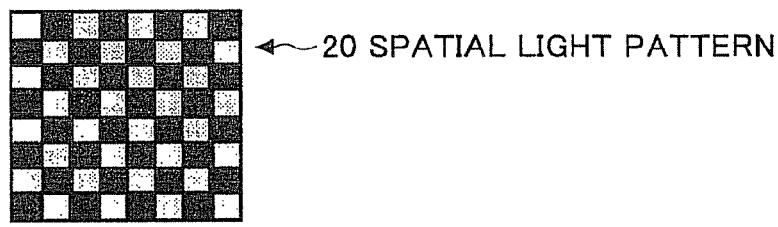
FIG. 2 is a drawing illustrating an example of a spatial light pattern.

FIG. 2 is a drawing illustrating an example of the spatial light pattern arranged in accordance with at least some embodiments described herein. In this example, the spatial light pattern may be a checkerboard pattern in which black square areas and white square areas are arranged alternately both in the vertical direction and in the horizontal direction. The projection unit 11 and the imaging unit 12 may be configured to have substantially the same angle of view. In such a case, each square area of the spatial light pattern projected by the projection unit 11 on a surface may appear to have a constant two-dimensional size in an image taken by the imaging unit 12 regardless of the distance z of the surface from the projection unit 11. That is, in the example illustrated in FIG. 1, the spatial light pattern projected on the surface of the object 16 may appear to have the same size as the spatial light pattern projected on the surface of the object 17 or 18 when viewed by the imaging unit 12. The projection unit 11 may be configured to have a focus position at a point $z_{pf}$ in the depth direction such that the focus point $z_{pf}$ is nearer than any objects (e.g., 16, 17, 18) that may be captured by the imaging unit 12. This arrangement may ensure that the blurring of the spatial light pattern monotonously increases in the depth direction z on an object surface situated at depth z. The projection unit 11 may have a focus position that is farther away from the projection unit 11 than any objects. This arrangement may ensure that the blurring of the spatial light pattern monotonously decreases in the depth direction z on an object surface situated at depth z.

Figure 3:
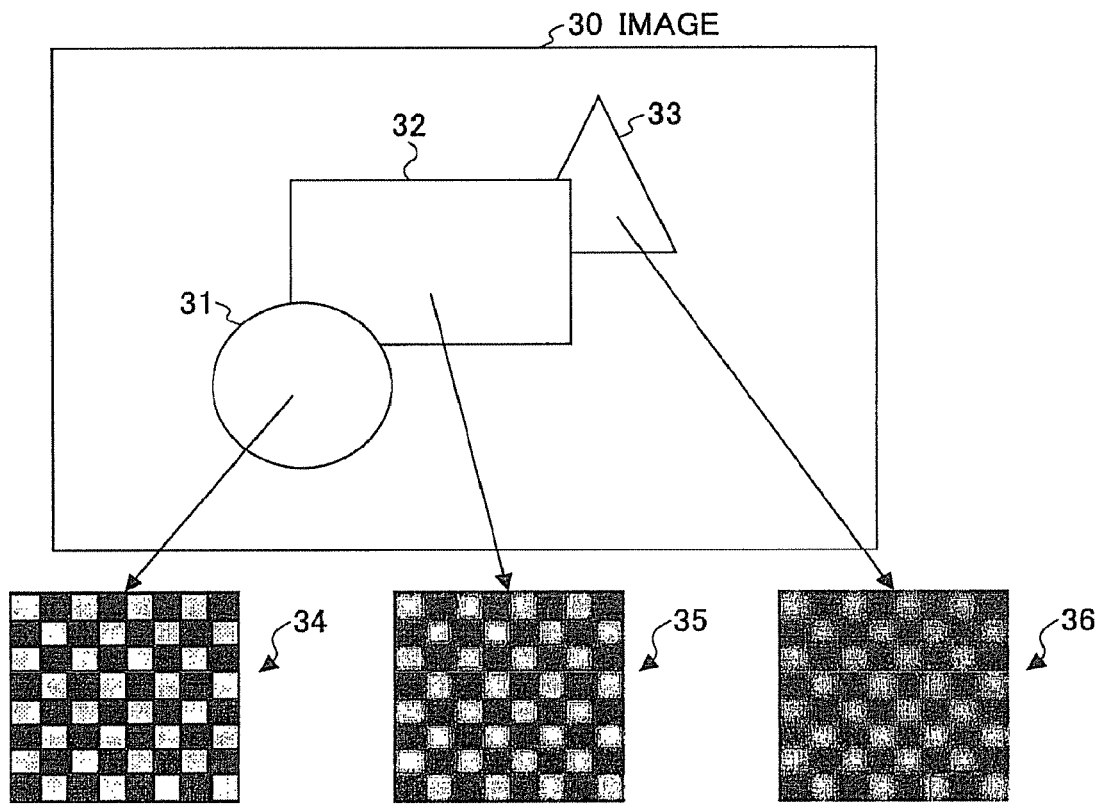
FIG. 3 is a drawing illustrating an example of the blurring of a spatial light pattern that monotonously increases in the depth direction on an object surface.

FIG. 3 is a drawing illustrating an example of the blurring of a spatial light pattern that monotonously increases in the depth direction z on an object surface arranged in accordance with at least some embodiments described herein. In FIG. 3, an image 30 captured by the imaging unit 12 may include an image 31 of the object 16 (see FIG. 1), an image 32 of the object 17, and an image 33 of the object 18. As illustrated in FIG. 1, the object 16, the object 17, and the object 18 may be arranged in the depicted order in the depth direction z, with the object 16 being the nearest to the imaging unit 12. In such a case, a spatial light pattern 34 projected on the nearest object 16 may be the sharpest, and a spatial light pattern 36 projected on the farthest object 18 may be the most blurred, with a spatial light pattern 35 projected on the object 17 being in the middle in terms of sharpness. Depth data may be extracted from the image 30 by analyzing, in a local image area of interest, the value of the predetermined frequency component which may be a function of the degree of blurring of the spatial light patterns 34, 35, and 36 appearing in the image 30.

The spatial light pattern projected by the projection unit 11 may be configured such that the spatial light patterns 34, 35, and 36 appearing in the captured image 30 are so fine that a person looking at the image 30 may not recognize the existence of the spatial light patterns. Such a fine light pattern may be produced by a digital projector which employs a liquid-crystal-display panel having a large number of pixels such as 1280.times.1024 pixels, 1920.times.1080 pixels, or the like. Under normal viewing conditions, human view may not perceive details as small as the size of a few pixels. That is, the spatial light patterns appearing in the image may be periodic at spatial frequency that is higher than spatial frequencies perceivable to human vision when the image is viewed. This arrangement may ensure that the quality of the image 30 from an aesthetic point of view be not undermined by the superimposed spatial light patterns. It may be noted, however, that the size of each square area of the checkerboard pattern may be at least twice as large as the pixel size both in the x direction and in the y direction. This arrangement may ensure that a proper sampling pitch be achieved by the imaging unit 12 in order to extract accurate information about the frequency components of the spatial light pattern.

The description provided above in respect of the spatial light pattern appearing in the image 30 of FIG. 3 has not taken into account the focusing of the imaging unit 12. If the imaging unit 12 is a pinhole camera, for example, the imaging unit 12 may be able to focus on any object at any distance. In such a case, a spatial light pattern projected on a given object surface may appear blurred in the captured image as it is on the object surface. That is, the focusing of the imaging unit 12 may be disregarded under some circumstances.

In reality, however, the characteristics of the optical system of the imaging unit 12 may affect the blurring of the spatial light pattern that appears in a captured image. That is, the focusing of the imaging unit 12 in addition to the focusing of the projection unit 11 may need to be taken into account when generating depth data from the image captured by the imaging unit 12. In some circumstances, the imaging unit 12 may focus on the object 16 that is an object of interest. In other circumstances, the imaging unit 12 may focus on the object 17 that is an object of interest, and may then focus on the object 18 that is a next object of interest. How to take into account the focusing of the imaging unit 12 and changes in its focus position are further described below. It may be noted here, however, that despite the focusing of the imaging unit 12, provision may easily be made such that the blurring of the spatial light pattern in the captured image monotonously increases or decreases in the depth direction z. Such monotonous characteristics may be provided by ensuring that a monotonous blurring increase (or decrease) in the depth direction caused by the projection unit 11 be predominant over a blurring change in the depth direction caused by the imaging unit 12.

Figure 4:
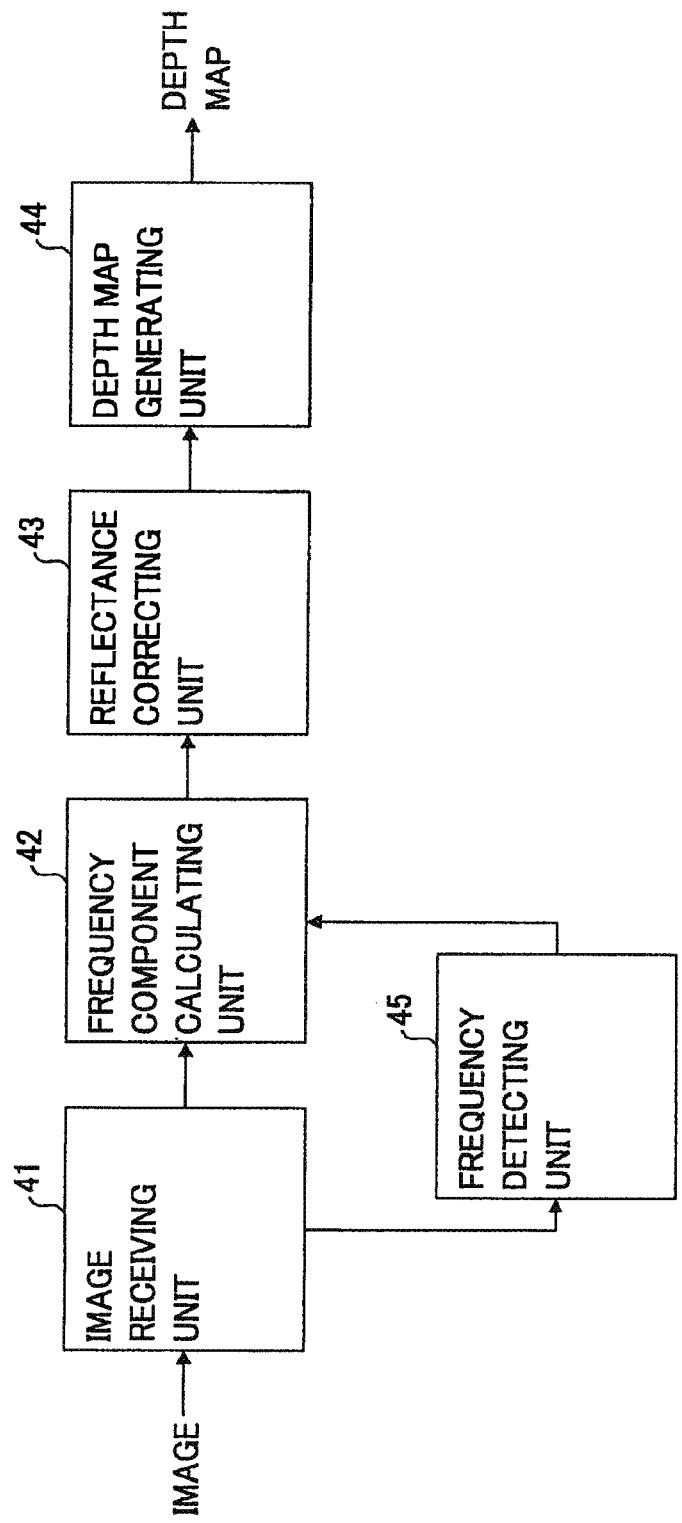
FIG. 4 is a block diagram illustrating an example of the configuration of a depth data generating apparatus.

FIG. 4 is a block diagram illustrating an example of the configuration of the depth data generating apparatus 13 arranged in accordance with at least some embodiments described herein. The depth data generating apparatus 13 illustrated in FIG. 4 may include an image receiving unit 41, a frequency component calculating unit 42, a reflectance correcting unit 43, a depth map generating unit 44, and a frequency detecting unit 45.

Figure 5:
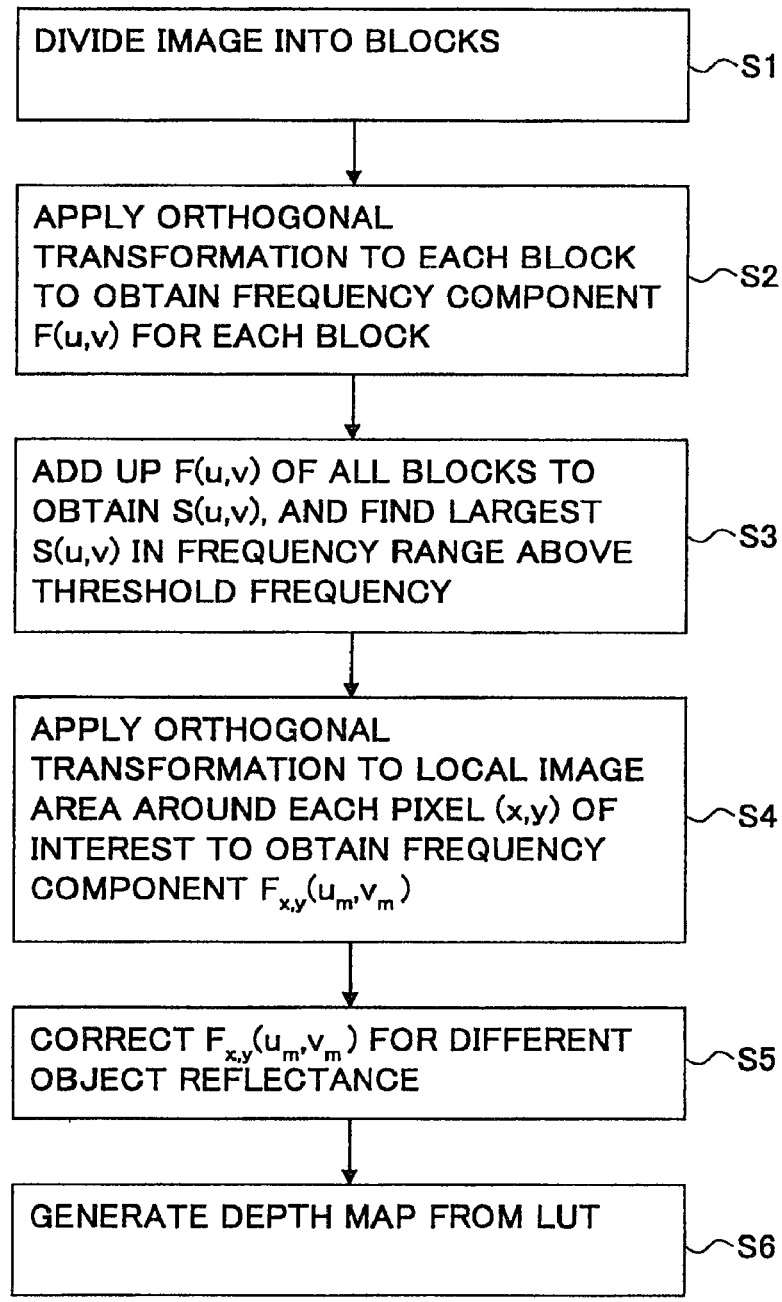
FIG. 5 is a flowchart illustrating a method for generating depth data performed by the depth data generating apparatus.

FIG. 5 is a flowchart illustrating a method for generating depth data performed by the depth data generating apparatus 13 arranged in accordance with at least some embodiments described herein. As depicted, an example method may include one or more operations, actions, or functions as illustrated by one or more of blocks S1, S2, S3, S4, S5 and/or S6. As the method in FIG. 5 could be implemented using, for example, the depth data generating apparatus 13 depicted in FIG. 4, the method for generating depth data will be described by referring to FIG. 4 and FIG. 5.

The image receiving unit 41 may receive from the imaging unit 12 an image of one or more objects on which a spatial light pattern is projected. In this image, the blurring of the spatial light pattern may monotonously increase or decrease in the depth direction. Processing may begin at block S1. At block S1, the frequency detecting unit 45 may divide the image into blocks, each of which may be a rectangular image area comprised of an array of pixels. Processing may continue from block S1 to block S2.

At block S2, the frequency detecting unit 45 may apply orthogonal transformation, such as a Fourier transform or a Hadamard transform, to each block to obtain frequency component $F(u,v)$ for each block. Here, $F(u,v)$ may be a discrete Fourier transform (or Hadamard transform, or any other orthogonal transform) of pixel data $b(x,y)$, which represents the pixel values of the pixel array corresponding to a block of interest. Coordinates x and y may represent pixel positions within the block of interest. Variable u represents spatial frequency in the x direction, and variable v represents spatial frequency in the y direction. Processing may continue from block S2 to block S3.

At block S3, the frequency detecting unit 45 may add up $F(u,v)$ of all the blocks to obtain $S(u,v)$, and may find the largest value of $S(u,v)$ in a frequency range above a threshold frequency. $S(u,v)$ may be the sum of $F(u,v)$ of the first block, $F(u,v)$ of the second block, $F(u,v)$ of the third block, . . . , and $F(u,v)$ of the N-th block when there are N blocks in the image. Since the spatial light pattern periodic at certain spatial frequency is included in the image, $S(u,v)$ may have a local maximum value at this spatial frequency within a frequency range above a certain threshold frequency. This threshold frequency may be determined by taking into account the spatial frequency at which the spatial light pattern is periodic. For example, the threshold frequency may be set lower than the above-noted special frequency but higher than most of the frequency spectrum of image information attributable to the captured scene. Since most of the frequency spectrum of image information attributable to the captured scene (i.e., excluding image information attributable to the projected spatial light pattern) resides at lower frequencies, the provision of such a threshold frequency may make it possible to detect the local maximum of the spectrum attributable to the projected spatial light pattern. In this manner, spatial frequency $(u_m, v_m)$ at which the spatial light pattern is periodic may be detected. Processing may continue from block S3 to block S4.

At block S4, the frequency component calculating unit 42 may apply orthogonal transformation, such as the Fourier transform or the Hadamard transform, to a local image area around each pixel of interest at coordinates (x,y) to obtain frequency component $F_{x,y}(u_m,v_m)$. This local image area may be a rectangular image area centered at coordinates (x,y). Here, $F_{x,y}(u,v)$ may be a discrete Fourier transform (or Hadamard transform, or any other orthogonal transform) of pixel data, which are the pixel values of the pixel array of the local image area. Processing may continue from block S4 to block S5.

At block S5, the reflectance correcting unit 43 may correct $F_{x,y}(u_m,v_m)$ for different object reflectance. The spatial light pattern projected by the projection unit 11 may be reflected by an object surface to reach the imaging unit 12. The intensity of the reflected light may depend on the reflectance of the object surface. As a result, pixel values (i.e., luminance values) of the captured image are dependent on the reflectance of each object surface. As the reflectance of the object surface increases, the pixel value of a pixel situated within an image area corresponding to this object surface may also increase. It follows that the value of $F_{x,y}(u_m,v_m)$ may also depend on object surface reflectance. The reflectance correcting unit 43 may remove variation in $F_{x,y}(u_m,v_m)$ caused by differences in object surface reflectance. This correction process may be described later in detail. Processing may continue from block S5 to block S6.

At block S6, the depth map generating unit 44 may generate a depth map based on the corrected $F_{x,y}(u_m,v_m)$ and a lookup table. The lookup table may indicate a relationship between depths (i.e., positions in the z direction) and the values of the spatial frequency component $F_{x,y}(u_m,v_m)$. This lookup table may be prepared in advance and stored in memory.

Figure 6:
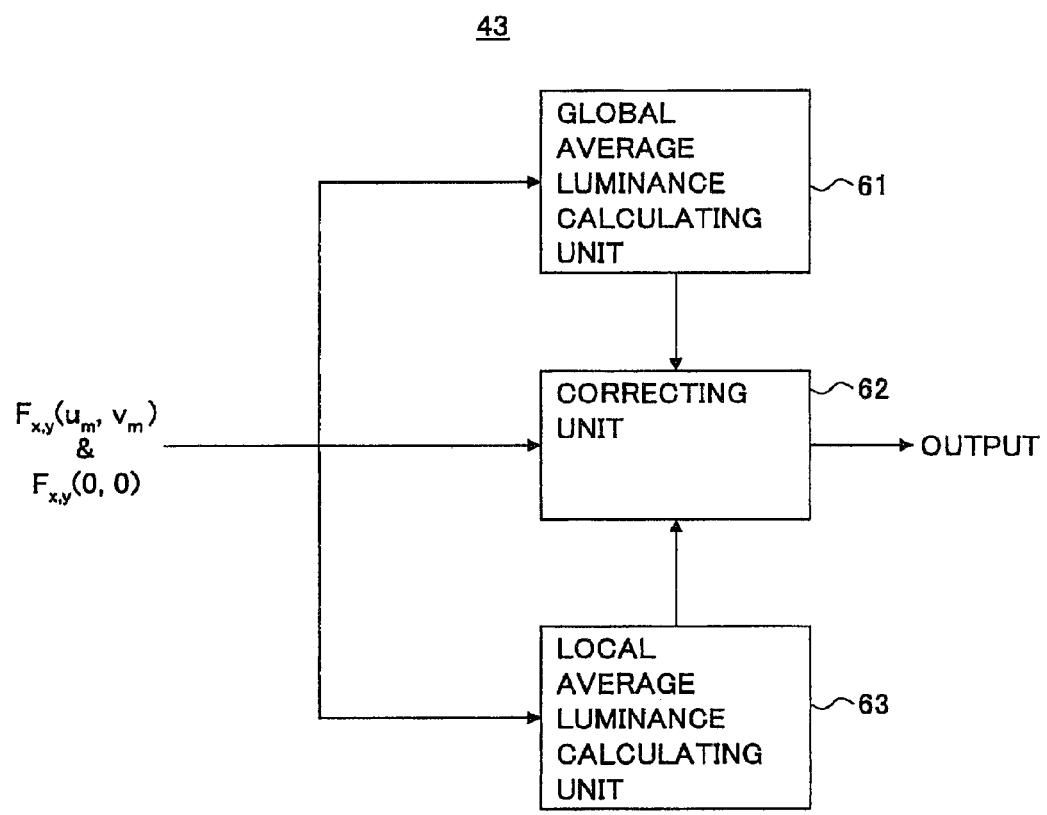
FIG. 6 is a block diagram illustrating an example of the configuration of a reflectance correcting unit.

FIG. 6 is a block diagram illustrating an example of the configuration of the reflectance correcting unit 43 arranged in accordance with at least some embodiments described herein. The reflectance correcting unit 43 illustrated in FIG. 6 may include a global average luminance calculating unit 61, a correcting unit 62, and a local average luminance calculating unit 63.

Figure 7:
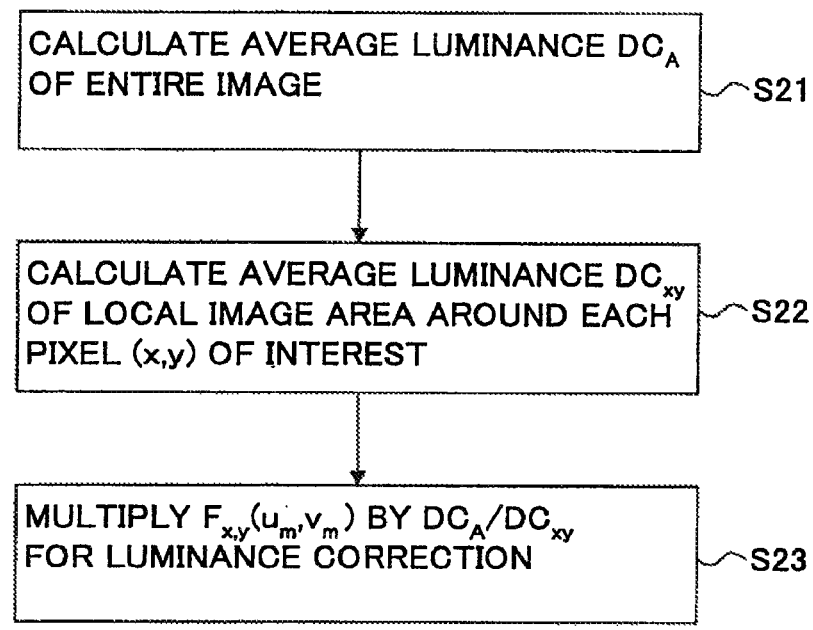
FIG. 7 is a flowchart illustrating the process of performing luminance correction performed by the reflectance correcting unit.

FIG. 7 is a flowchart illustrating a method for performing luminance correction performed by the reflectance correcting unit 43 arranged in accordance with at least some embodiments described herein. As depicted, an example method may include one or more operations, actions, or functions as illustrated by one or more of blocks S21, S22 and/or S23. As the method in FIG. 7 could be implemented using, for example, the reflectance correcting unit 43 depicted in FIG. 6, the method for performing luminance correction will be described by referring to FIG. 6 and FIG. 7. Processing may begin at block S21.

At block S21, the global average luminance calculating unit 61 may calculate average luminance $DC_A$ of the entire image. The average luminance $DC_A$ of the entire image may be calculated by adding up all the pixel values and by dividing the obtained sum by the number of pixels. Alternatively, the average luminance $DC_A$ of the entire image may be calculated by using a direct current component $F_{x,y}(0,0)$ that may be obtained together with $F_{x,y}(u_m,v_m)$. Since the direct current component $F_{x,y}(0,0)$ is proportional to the sum of pixel values within the local image area, the global average luminance calculating unit 61 may use $F_{x,y}$ (0,0) to obtain the average luminance $DC_A$ of the entire image. Processing may continue from block S21 to block S22.

At block S22, the local average luminance calculating unit 63 may calculate average luminance $DC_{xy}$ of a local image area around each pixel of interest situated at coordinates (x,y). The average luminance $DC_{xy}$ of the local image area may be calculated by adding up all the pixel values of the local image area and by dividing the obtained sum by the number of pixels. Alternatively, the average luminance $DC_{xy}$ of the local image area may be directly obtained from the direct current component $F_{x,y}(0,0)$. Processing may continue from block S22 to block S23.

At block S23, the correcting unit 62 may multiply $F_{x,y}(u_m,v_m)$ by $DC_A/DC_{xy}$ for luminance correction. It may be noted that local average luminance $DC_{xy}$ of a local image area may be proportional to the reflectance of an object surface corresponding to this local image area. Further, the value of $F_{x,y}(u_m,v_m)$ may also be proportional to the reflectance of the object surface corresponding to this local image area. Accordingly, multiplication by $DC_A/DC_{xy}$ may remove the effect of object-surface reflectance variation from $F_{x,y}(u_m,v_m)$. It may also be noted that for the purpose of removing the effect of object-surface reflectance variation, it may suffice to multiply $F_{x,y}(u_m,v_m)$ by $1/DC_{xy}$.

Figure 8:
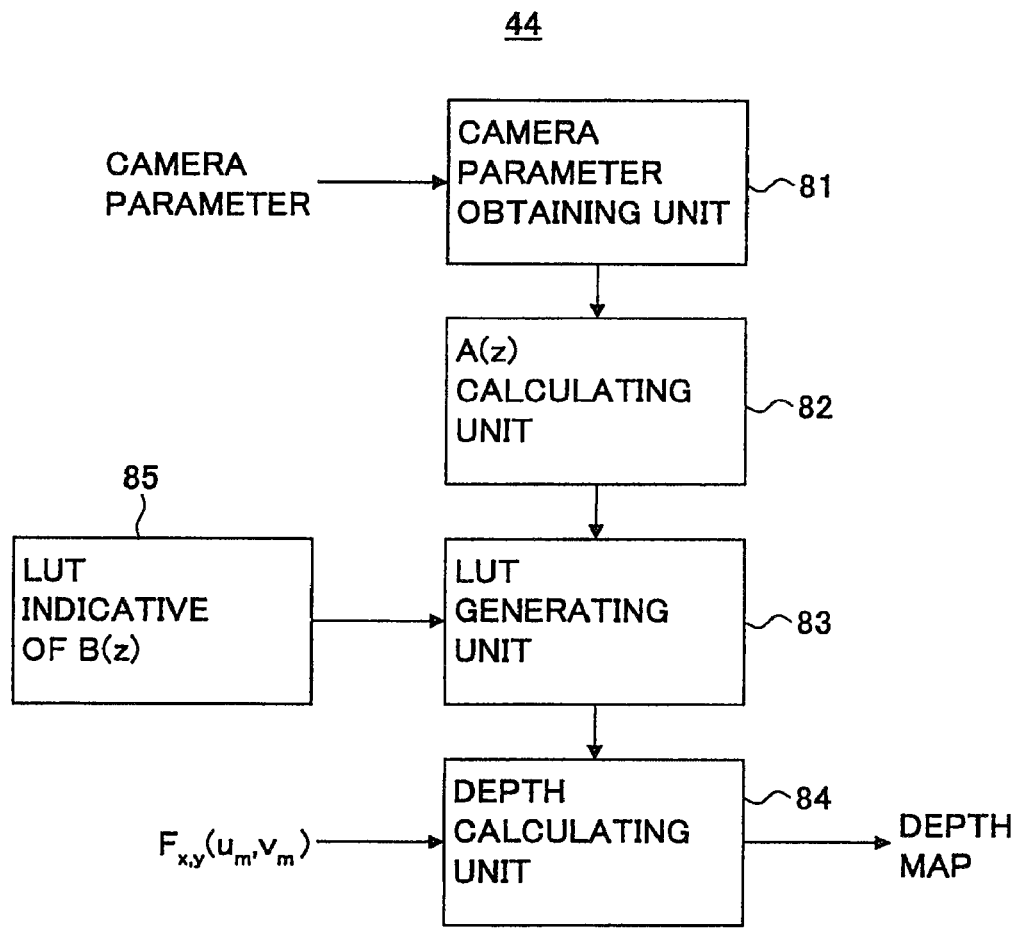
FIG. 8 is a block diagram illustrating an example of the configuration of a depth map generating unit.

FIG. 8 is a block diagram illustrating an example of the configuration of the depth map generating unit 44 arranged in accordance with at least some embodiments described herein. The depth map generating unit 44 illustrated in FIG. 8 includes a camera parameter obtaining unit 81, an A(z) calculating unit 82, an LUT generating unit 83, a depth calculating unit 84, and an LUT (lookup table) 85 indicative of B(z). A(z) may represent a relationship between position in the depth direction and the blurring of the spatial light pattern caused by the projection unit 11 that projects the spatial light pattern. B(z) may represent a relationship between position in the depth direction and the blurring of the spatial light pattern caused by the imaging unit 12 that captures an image.

Figure 9:
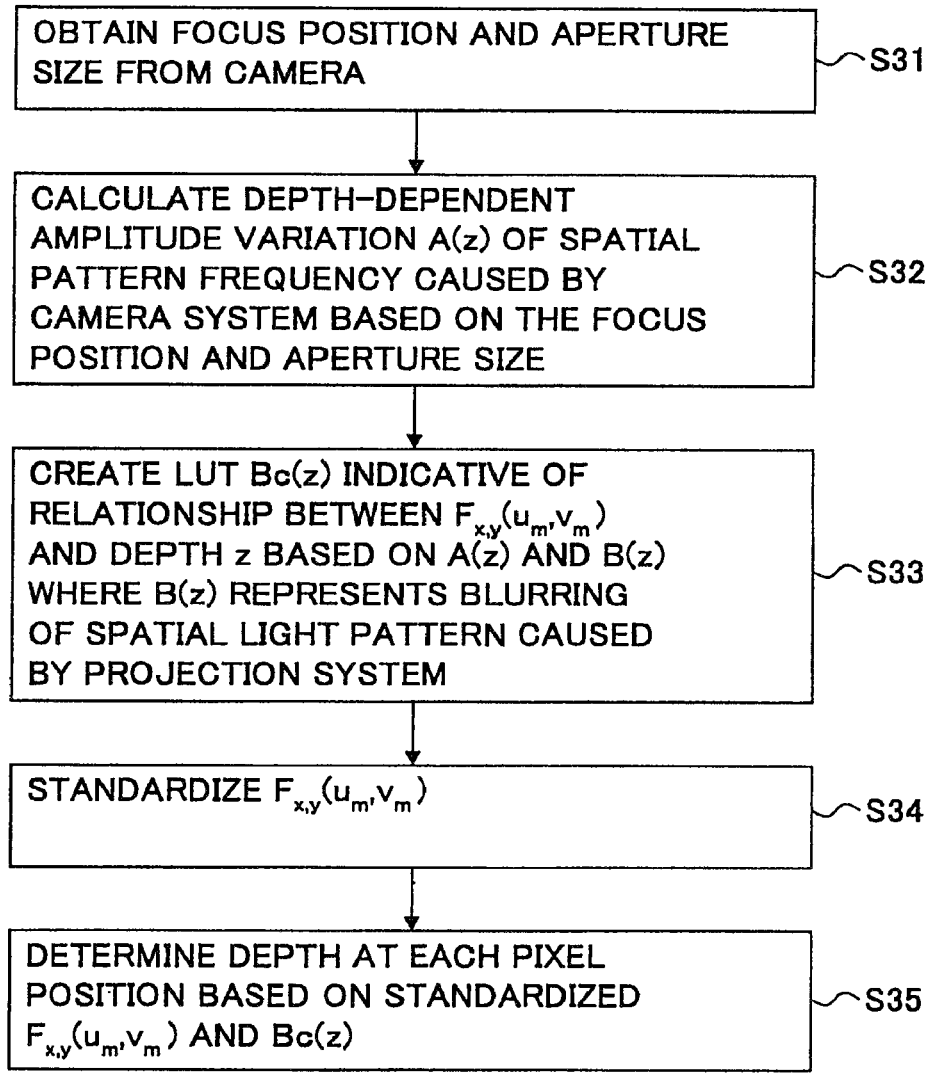
FIG. 9 is a flowchart illustrating a method for determining depth data performed by the depth map generating unit.

FIG. 9 is a flowchart illustrating a method for determining depth data performed by the depth map generating unit 44 arranged in accordance with at least some embodiments described herein. As depicted, an example method may include one or more operations, actions, or functions as illustrated by one or more of blocks S31, S32, S33, S34 and/or S35. The depicted example method determines depth data by combining the effect of focusing of the projection unit 11 with the effect of focusing of the imaging unit 12. As the method in FIG. 9 could be implemented using, for example, the depth map generating unit 44 depicted in FIG. 8, the method for determining depth data will be described by referring to FIG. 8 and FIG. 9. Processing may begin at block S31.

At block S31, the camera parameter obtaining unit 81 may obtain a focus position $z_a$, in the z direction and an aperture size D from the imaging unit 12. The camera parameter obtaining unit 81 may also obtain a focus position $(x_{cf},y_{cf})$, at which point in the x-y plane the imaging unit 12 focuses on an object surface. The aperture size D may typically be provided in the form of a focal length f and an f-number N. The aperture size (i.e., the diameter of an entrance pupil) D may then be calculated as $D=f/N$. Processing may continue from block S31 to block S32.

At block S32, the A(z) calculating unit 82 may calculate a depth-dependent amplitude variation A(z) of the spatial pattern frequency caused by the camera optical system (i.e., the imaging unit 12) as a function of depth z based on the focus position $z_{cf}$ and the aperture size D. This depth-dependent amplitude variation A(z) may represent the amplitude of the spatial frequency ($u_m,v_m$) of the spatial light pattern on a surface positioned at depth z as viewed by the imaging unit 12 focusing on the focus position $z_{cf}$. This spatial light pattern may be an ideal spatial light pattern having no blurring on the surface positioned at depth z. Namely, the depth-dependent amplitude variation A(z) may take into account only the blurring of the spatial light pattern caused by the imaging unit 12 under the condition in which the blurring of the spatial light pattern caused by the projection unit 11 is nonexistent.

The depth-dependent amplitude variation A(z) may be obtained as follows. A point-spread function of the imaging unit 12 focusing on the distance $z_{cf}$ may be represented as psf(x,y,z) that assumes a value of $(2(z_{cf}+z)/Dz)^2/pi$ (pi=3.14 . . . ) within a circular area having a diameter of $Dz/(z_{cf}+z)$ and that assumes zero outside this circular area. The spatial light pattern positioned at depth z may then appear in an image captured by the imaging unit 12 as $p(x,y)=p_0(x,y)$ *psf(x,y,z) where $p_0(x,y)$ is the spatial light pattern at position $z_{cf}$ and the symbol "*" represents a convolution operation. An orthogonal transform (e.g., Fourier transform or Hadamard transform) of p(x,y) with respect to x and y may be represented as $P(u,v)=P_0(u,v)PSF(u,v,z)$ where $P_0(u,v)$ and PSF(u,v,z) are orthogonal transforms of $p_0(x,y)$ and psf(x,y,z), respectively. Then, the depth-dependent amplitude variation A(z) may be equal to $P(u_m,v_m)$ where ($u_m,v_m$) is the spatial frequency at which the spatial light pattern is periodic. Processing may continue from block S32 to block S33.

At block S33, the LUT generating unit 83 may create a lookup table Bc(z) indicative of a relationship between $F_{x,y}(u_m,v_m)$ and depth z based on A(z) and B(z) where B(z) represents the blurring of the spatial light pattern caused by the projection unit 11. B(z) may be obtained in advance as follows. First, the projection unit 11 may project the spatial light pattern (e.g., checkerboard pattern) on a blank, flat surface (e.g., white, flat surface) positioned at depth z while focusing on the depth $z_{pf}$ as described in connection with FIG. 1. An image of this spatial light pattern on the surface positioned at depth z may then be captured by the imaging unit 12 focusing on this surface positioned at depth z. A spatial light pattern p(x,y,z) in the captured image may include blurring caused by the projection unit 11, but may not include blurring caused by the imaging unit 12. When an orthogonal transform of p(x,y,z) with respect to x and y is denoted as P(u,v,z), B(z) may be represented as $P(u_m,v_m,z)$. B(z) obtained in this manner in advance may be stored as a lookup table B(z) in memory. The depth-dependent amplitude variation that factors in both the blurring caused by the projection unit 11 and the blurring caused by the imaging unit 12 may then be represented as A(z)B(z). Namely, A(z)B(z) may be stored as a lookup table Bc(z). It may be noted that B(z) may alternatively be obtained as the depth-dependent characteristics of a point-spread function by projecting a single light spot rather than the spatial light pattern such as a checkerboard pattern. It may further be noted that B(z) may alternatively be obtained as a mathematical formula that approximates a point-spread function of the projection unit 11. The point spread function may be similar to psf(x,y,z) previously described, or may be represented by a Gaussian function. When B(z) is provided as a mathematical formula, Bc(z) may also be obtained as a mathematical formula rather than as a lookup table. Processing may continue from block S33 to block S34.

At block S34, the depth calculating unit 84 may standardize $F_{x,y}(u_m,v_m)$ for a luminance factor. As previously described, the value of the frequency component as corrected by the reflectance correcting unit 43 for reflectance variation may be $F_{x,y}(u_m,v_m) DC_A/DC_{xy}$. The focus position ($x_{cf},y_{cf}$) at which point in the x-y plane the imaging unit 12 focuses on an object surface may be obtained from the imaging unit 12 in block S1 of FIG. 9. The value of $F_{x,y}(u_m,v_m) DC_A/DC$, at this focus position ($x_{cf},y_{cf}$) may be denoted as $R_{xy}$. Then, the depth calculating unit 84 may standardize the value of $F_{x,y}(u_m,v_m) DC_A/DC_{xy}$ at any given spatial coordinates (x,y) in the captured image by multiplying this value by $Bc(z_{cf})/R_{xy}$. This standardization process may ensure that the amplitude of the spatial frequency ($u_m,v_m$) at the focus position ($x_{cf},y_{cf}$) at the focus depth $z_{cf}$ be equal to $Bc(z_{cf})$. Processing may continue from block S34 to block S35.

At block S35, the depth calculating unit 84 may determine a depth at each pixel position based on the standardized. Namely, the depth calculating unit 84 may refer to the lookup table Bc(z) to find a depth z associated with the $(F_{x,y}(u_m,v_m) DC_A/DC_{xy})x(Bc(z_{cf})/R_{xy})$. The depth z found in the lookup table Bc(z) may be the depth at which an object surface corresponding to the pixel position (x,y) is positioned in the scene captured by the imaging unit 12.

In the manner described above, the blurring of the spatial light pattern caused by the projection unit 11 and the blurring of the spatial light pattern caused by the imaging unit 12 may both be taken into account in a depth map generated by the depth map generating unit 44. Further, as previously noted, despite the focusing of the imaging unit 12, provision may easily be made such that the blurring of the spatial light pattern in the captured image monotonously increases or decreases in the depth direction z. Such monotonous characteristics may be provided by ensuring that a monotonous blurring increase (or decrease) in the depth direction caused by the projection unit 11 be predominant over a blurring change in the depth direction caused by the imaging unit 12.

Figure 10:
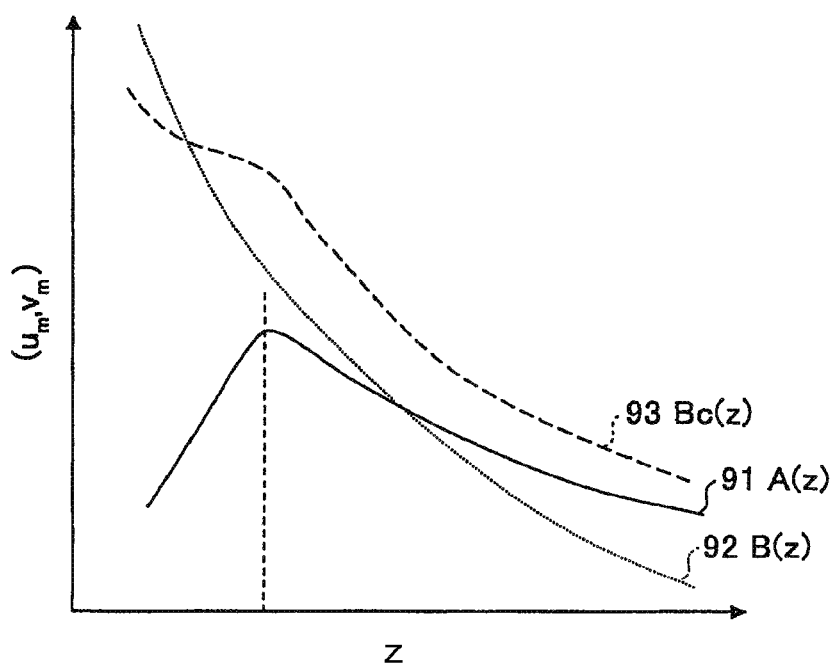
FIG. 10 is a drawing illustrating an example of a monotonous blurring increase in the depth direction; all arranged in accordance with at least some embodiments described herein.

FIG. 10 is a drawing illustrating an example of a monotonous blurring increase in the depth direction arranged in accordance with at least some embodiments described herein. The horizontal axis may represent depth z, and the vertical axis may represent the amplitude of the spatial frequency ($u_m,v_m$). A characteristic curve 91 may correspond to A(z), which may represent the blurring of the spatial light pattern caused by the imaging unit 12. The imaging unit 12 may have a focus position at an object of interest, so that the characteristics curve 91 may have a maximum peak at this focus position in the depth direction z. A characteristic curve 92 may correspond to B(z), which may represent the blurring of the spatial light pattern caused by the projection unit 11. The projection unit 11 may have a focus position at the nearest point in the depth direction z, so that the characteristics curve 92 monotonously falls as depth z increases. Namely, the blurring represented by the characteristic curve 92 may monotonously increase as depth z increases.

As illustrated in FIG. 10, provision may be made such that a monotonous blurring increase in the depth direction caused by the projection unit 11 be predominant over a blurring change in the depth direction caused by the imaging unit 12. Accordingly, a characteristics curve 93 which corresponds to Bc(z)=A(z)B(z) may monotonously fall as depth z increases. That is, blurring obtained by combining the blurring caused by the projection unit 11 and the blurring caused by the imaging unit 12 may monotonously increase as depth z increases. With such blurring characteristics, depth data may be uniquely determined from a given amplitude of the spatial frequency $(u_m, v_m)$.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally may include one or more of a system unit housing, a video display device, a memory such as volatile and non-volatile memory, processors such as micro-processors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It should also be understood that, the term "optimize" may include maximization and/or minimization. The term "minimization" and/or the like as used herein may include a global minimum, a local minimum, an approximate global minimum, and/or an approximate local minimum. Likewise, it should also be understood that, the term "maximization" and/or the like as used herein may include a global maximum, a local maximum, an approximate global maximum, and/or an approximate local maximum.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A method for use at a computing device, the method for transmitting image data for a stereoscopic view of an image, the method comprising:
    receiving the image of one or more objects, wherein the image is a two-dimensional image with a superimposed spatial light pattern;
    generating depth data associated with the image based on at least a degree of blur of the superimposed spatial light pattern within the image, wherein the blur of the superimposed spatial light pattern within the image increases in a first depth direction of the image and decreases in a second depth direction of the image, and wherein generating the depth data associated with the image comprises:
        dividing the image into a plurality of blocks;
        for each block included in the plurality of blocks, obtaining a frequency component for the block; and
        detecting a local maximum of a spectrum attributable to the superimposed spatial light pattern by adding the frequency components for each block of the plurality of blocks together; and
    providing the image together with the depth data to enable the stereoscopic view of the image.

2. The method of claim 1, wherein the superimposed spatial light pattern is projected on the one or more objects during capture of the two-dimensional image.

3. The method of claim 1, wherein the superimposed spatial light pattern is a checkboard pattern.

4. The method of claim 3, wherein the checkboard pattern includes black square areas and white square areas arranged alternately both in a vertical direction and in a horizontal direction.

5. The method of claim 1, wherein generating the depth data associated with the image comprises: accounting for blur of the superimposed spatial light pattern caused by an image projection device and accounting for blur of the superimposed spatial light pattern caused by an image capture device.

6. The method of claim 1, wherein the superimposed spatial light pattern is periodic at a spatial frequency that is higher than spatial frequencies perceivable to human vision.

7. The method of claim 1, wherein obtaining the frequency component for the block comprises obtaining a frequency component that represents pixel values of a pixel array that corresponds to the block.

8. A method for use at a computing device, the method for transmitting image data for a stereoscopic view of an image, the method comprising:
receiving image data that includes a superimposed spatial light pattern, wherein the image data represents a two-dimensional image, and wherein the superimposed spatial light pattern is indicative of depth in the two-dimensional image, based on a degree of blur of the superimposed spatial light pattern within the image data received at an image capture device, and wherein the blur of the superimposed spatial light pattern increases in a first depth direction of the two-dimensional image and decreases in a second depth direction of the two-dimensional image; and
transmitting the image data together with the superimposed spatial light pattern to enable the stereoscopic view of the two-dimensional image, wherein enabling the stereoscopic view of the two-dimensional image includes generating depth data for the two-dimensional image, and wherein generating the depth data comprises:
dividing the two-dimensional image into a plurality of blocks;
obtaining a frequency component for each block of the plurality of blocks; and
detecting a local maximum of a spectrum attributable to the superimposed spatial light pattern by addition of the frequency components for each block of the plurality of blocks together.

9. The method of claim 8, wherein generating the depth data for the two-dimensional image further comprises accounting for blur of the superimposed spatial light pattern caused by an image projection device and accounting for blur of the superimposed spatial light pattern caused by the image capture device.

10. The method of claim 9, wherein the depth data enables the stereoscopic view of the image.

11. The method of claim 9, further comprising:
transmitting image capture parameters of the image capture device, wherein the image capture parameters further enable the generation of the depth data.

12. The method of claim 11, wherein the image capture parameters include at least a focus position and an aperture size of the image capture device.

13. The method of claim 8, wherein transmitting the image data together with the superimposed spatial light pattern to enable the stereoscopic view of the image comprises transmitting the image data together with the superimposed spatial light pattern via one of a transitory medium or a non-transitory medium.

14. The method of claim 13, wherein the transitory medium comprises an electromagnetic signal communication channel.

15. A non-transitory computer-readable medium storing code that, when executed by a processor, causes the processor to:
receive an image of a scene, wherein the image of the scene includes a superimposed spatial light pattern;
generate a depth map of the image based on a degree of blur of the superimposed spatial light pattern within the image of the scene, wherein the blur of the superimposed spatial light pattern within the image of the scene increases in a first depth direction of the image of the scene and decreases in a second depth direction of the image of the scene, and wherein the depth map comprises depth data associated with a plurality of local image areas of the image of the scene, and wherein to generate the depth map of the image, the code, when executed by the processor, causes the processor to;
divide the image of the scene into a plurality of blocks;
for each block included in the plurality of blocks, obtain a frequency component for the block; and
detect a local maximum of a spectrum attributable to the superimposed spatial light pattern by addition of the frequency components for each block of the plurality of blocks together; and
provide the image of the scene and the depth map to enable a stereoscopic view of the image of the scene.

16. The non-transitory computer-readable medium storing code of claim 15, wherein when the code is executed by a processor, further causes the processor to:
calculate a value of a pre-determined spatial frequency component for each of the plurality of local image areas of the image of the scene, wherein each of the plurality of local image areas are associated with a respective pixel of the image of the scene.

17. The non-transitory computer-readable medium storing code of claim 16, wherein when the code is executed by a processor, further causes the processor to:
determine the depth data for each of the plurality of local area images based on the calculated values of the pre-determined spatial frequency component of the image of the scene for each of the plurality of local image areas of the image of the scene.

18. The non-transitory computer-readable medium storing code of claim 17, wherein when the code is executed by a processor, further causes the processor to:
look up a relationship between depth and the calculated values of the predetermined spatial frequency component of the image from a look up table to determine the depth data for each pixel.

19. The non-transitory computer-readable medium storing code of claim 15, wherein the superimposed spatial light pattern includes black square areas and white square areas arranged alternately both in a vertical direction and in a horizontal direction.

20. The non-transitory computer-readable medium storing code of claim 15, wherein the superimposed spatial light pattern is periodic at a spatial frequency that is higher than spatial frequencies perceivable to human vision.

* * * * *

UNITED STATES PATENT AND TRADEMARK OFFICE
CERTIFICATE OF CORRECTION

PATENT NO.       : 9,746,319 B2                                  Page 1 of 1
APPLICATION NO.  : 14/660769
DATED            : August 29, 2017
INVENTOR(S)      : Uehira et al.

It is certified that error appears in the above-identified patent and that said Letters Patent is hereby corrected as shown below:

In the Specification

In Column 8, Line 55, delete "position za," and insert -- position $z_{cf}$, --, therefor.

In the Claims

In Column 16, Line 9, in Claim 15, delete "scene, and wherein" and insert -- scene, wherein --, therefor.

In Column 16, Line 13, in Claim 15, delete "processor to;" and insert -- processor to: --, therefor.

Signed and Sealed this
Twelfth Day of December, 2017

Joseph Matal
*Performing the Functions and Duties of the*
*Under Secretary of Commerce for Intellectual Property and*
*Director of the United States Patent and Trademark Office*